(12) United States Patent
Brechner et al.

(10) Patent No.: US 6,970,859 B1
(45) Date of Patent: Nov. 29, 2005

(54) SEARCHING AND SORTING MEDIA CLIPS HAVING ASSOCIATED STYLE AND ATTRIBUTES

(75) Inventors: Eric L. Brechner, Woodinville, WA (US); Dean A. Slawson, Redmond, WA (US); David A. Vest, Kirkland, WA (US); Krzysztof J. Cwalina, Redmond, WA (US); Glen Iwasaki, Bellevue, WA (US); John J. Thrall, Mountain View, CA (US); Colin R. Anthony, East St. Louis, IL (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,504

(22) Filed: Mar. 23, 2000
(Under 37 CFR 1.47)

(51) Int. Cl.[7] .............................................. G06F 17/30
(52) U.S. Cl. ..................... 707/3; 707/4; 707/5; 707/7; 348/231.3
(58) Field of Search ........................... 707/3–5, 104.1, 707/7; 355/64; 348/571, 231.3

(56) References Cited

U.S. PATENT DOCUMENTS

| | | | | |
|---|---|---|---|---|
| 5,751,286 A | * | 5/1998 | Barber et al. ............... | 345/835 |
| 6,175,829 B1 | * | 1/2001 | Li et al. ...................... | 707/3 |
| 6,233,547 B1 | * | 5/2001 | Denber ........................ | 704/9 |
| 6,243,713 B1 | * | 6/2001 | Nelson et al. ............. | 707/104.1 |
| 6,313,877 B1 | * | 11/2001 | Anderson ................. | 348/333.05 |
| 6,480,840 B2 | * | 11/2002 | Zhu et al. .................... | 707/3 |
| 6,591,010 B1 | * | 7/2003 | Russin ....................... | 382/209 |
| 6,625,315 B2 | * | 9/2003 | Laumeyer et al. .......... | 382/190 |

* cited by examiner

Primary Examiner—Frantz Coby
Assistant Examiner—Haythim Alaubaidi
(74) Attorney, Agent, or Firm—Ronald M. Anderson

(57) ABSTRACT

A style identifier is associated with each of a plurality of media clips stored in a database, based on a subjective evaluation of various characteristics of each media clip by an expert. The style represented by the style identifier corresponds to an impression on the expert regarding various qualities of the media clip and is not constrained by the subject of the media clip. Media clips with which style identifiers are associated can be any form of digital media, such as clip art files, sound files, photographs, animation files, fonts, etc. Also associated with each media clip in the database is an absolute ranking value for each of a plurality of different attributes based on a subjective evaluation of each media clip by an expert. A user can search the database for media clips associated with a specific style identifier and can sort the media clips that were identified by a search, based upon the absolute ranking value for a selected attribute. In one application of this invention, the database is maintained at a web site accessible over the Internet, and users can browse or search the database based upon a selected category, a keyword, or a style. The results of browsing or searching the database can be selectively sorted in regard to a selected attribute. Thus, with this invention, a user can more readily identify an appropriate media clip that is suitable for an intended use.

38 Claims, 7 Drawing Sheets

| CONCEPT | STYLE 210 | STYLE 149 | STYLE 100 | STYLE 389 | STYLE 88 | STYLE 1041 |
|---|---|---|---|---|---|---|
| DOGS | | | | | | |
| KIDS | | | | | | |
| TRAVEL | | | | | | |
| NATURE | | | | | | |
| SPORTS | | | | | | |

FIG. 7

SEARCHING AND SORTING MEDIA CLIPS HAVING ASSOCIATED STYLE AND ATTRIBUTES

FIELD OF THE INVENTION

This invention generally pertains to searching and sorting data in a database, and more specifically, to searching and sorting digital media using subjectively assigned criteria.

BACKGROUND OF THE INVENTION

Electronic publishing, increasing use of graphics and sounds in email, and other factors have created a growing demand by computer users for clip art and other forms of media clips. When creating an electronic document with a software application, tools are usually provided that enable a user to browse available media clips so that an appropriate clip can be selected for use in the document. Most users will have at least a limited collection of media clips stored on a local hard drive. Alternatively, media clips are now readily available from various sites on the Internet, such as Microsoft Corporation's CLIP GALLERY LIVE 2000™ web site, and are also distributed on compact disk-read only memory (CD-ROM), DVD, and through other forms of memory media.

As used herein, the term "media clip(s)" is intended to encompass all forms of digital media, including but not limited to, graphic images, sounds, animations, fonts, and photographs.

The sheer number of media clips that are available from various sources can be overwhelming to a user attempting find a particular media clip most suitable to individual needs and taste. A person may have a collection of hundreds of media clips stored on a hard drive or available over a local area network (LAN) to which the person's computer is connected. When accessing a web site at which media clips are available, there may be thousands of choices available. Choosing a suitable media clip from such a vast number has become increasingly difficult and time consuming.

One way to select a desired media clip from a database in which they are stored is to search the clips based on a keyword. Media clips frequently will have one or more keywords associated with them that enable a user to search for media clips that are directed to a subject referenced by a keyword or by a category entered by the user. Or, a user can simply start browsing through the available clips, hoping to come across one that is suitable. In either case, it is desirable for a user who has searched a database based on a keyword and found a media clip that has suitable qualities, to be able to search for other media clips with similar qualities. These qualities will often be difficult to define and frequently will not be limited to a single subject.

It would also be helpful to enable a user to sort the results of a search performed either on keyword or a category, so that the order in which the results are presented to the user is based upon an absolute ranking of the media clips in regard to a particular predefined attribute. No prior art software is available that enables media clips to be searched and/or sorted in this manner. It would therefore be desirable to provide such capabilities to assist users in selecting a suitable media clip that meets the needs and tastes of the user.

SUMMARY OF THE INVENTION

In accord with the present invention, a method is defined for enabling media clips having a common desired characteristic quality to be identified from among a plurality of different media clips. Each of the media clips is associated with a style identifier that is indicative of and corresponds to a characteristic quality of the media clip. The method includes the step of enabling a desired style identifier to be provided as a search criterion. An automated search of the plurality of different media clips is then initiated, based upon the search criterion that was provided. As a result of the automated search of the plurality of different media clips, any media clips that have been associated with the desired style identifier and thus have a common desired characteristic quality are identified.

Further, for each of a plurality of different attributes, each media clip in the plurality of different media clips is associated with an absolute ranking value. The method thus preferably also includes the step of enabling a desired attribute to be selected for use in sorting the plurality of different media clips, based upon the absolute ranking value of the desired attribute that was associated with each media clip. The plurality of different media clips is then sorted as a function of the absolute ranking value associated with each media clip for the desired attribute that was selected.

The media clips that were identified by the automated search as having been associated with the desired style identifier can thus be sorted as a function of the absolute ranking value associated with each media clip for the desired attribute that was selected. The plurality of media clips may be stored on a local non-volatile memory medium, or in a database that is accessible over a network.

Another aspect of the present invention is directed to a system that includes a processor and a memory in which a plurality of machine instructions is stored. Coupled in communication with the processor are a display and a user input device. The processor executes the machine instructions and as a result, carries out functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings. The file of this patent contains at least one drawing executed in color. Copies of this patent with color drawings will be provided by the Patent and Trademark Office upon request and payment of the necessary fee.

FIG. 1 a color reproduction of a portion of a web page for an Internet site that employs the present to enable users to browse a database of media clips, based upon a selected category, and optionally, to browse only a selected type of media clips;

FIG. 5 is a color reproduction of a portion of a web page showing thumbnail icons for media clips returned by searching on a style of the media clip shown in FIG. 4, and ordered based upon a selected attribute;

FIG. 6 is a color reproduction of a portion of a web page showing sound media clips returned by searching for a keyword in a selected category;

FIG. 7 is color table showing media clips organized according to concept keywords in rows and according to style in columns, demonstrating that style relates to a different characteristic than concept or keyword;

Figures 8A, 8B:
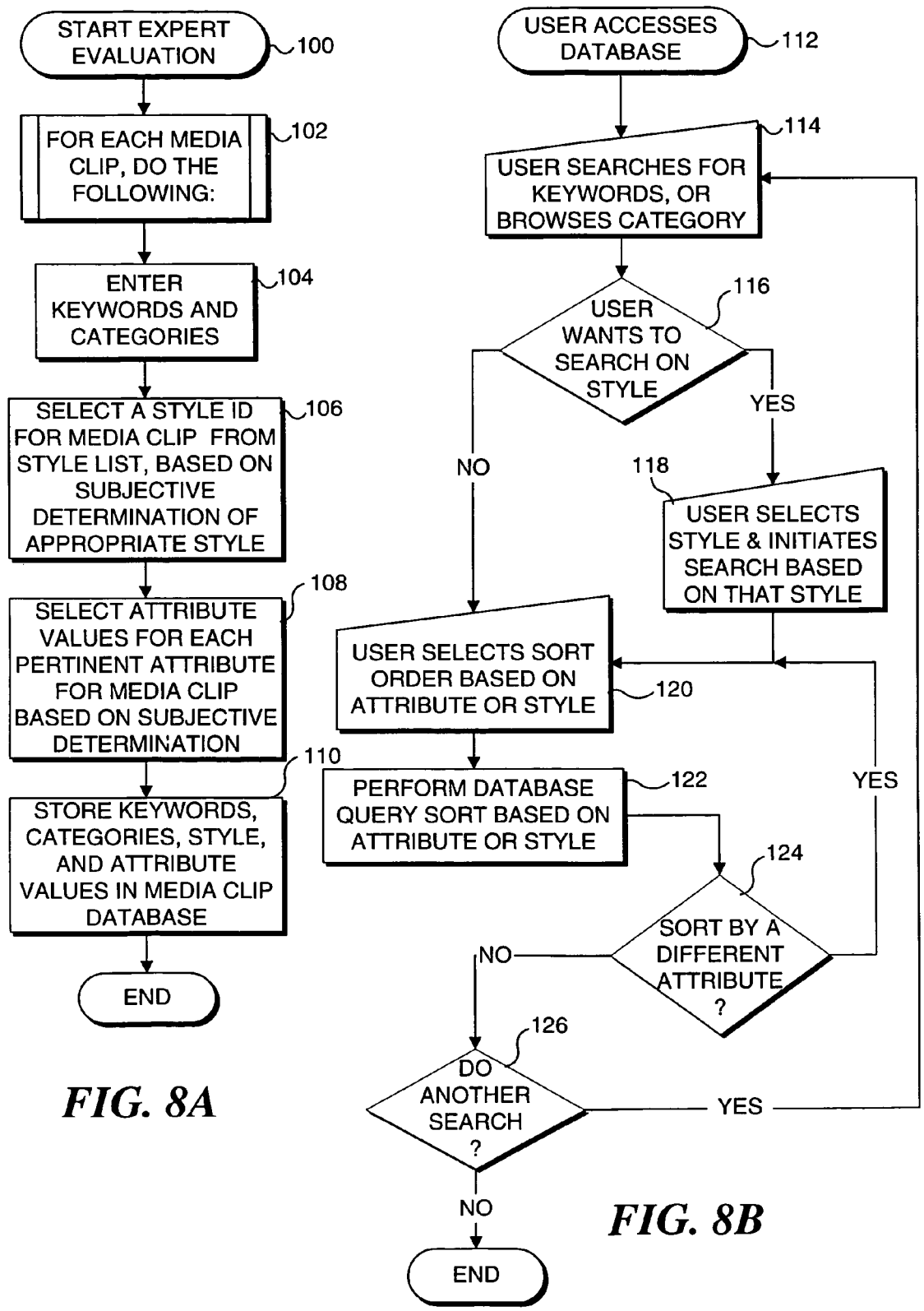
Figure 9:
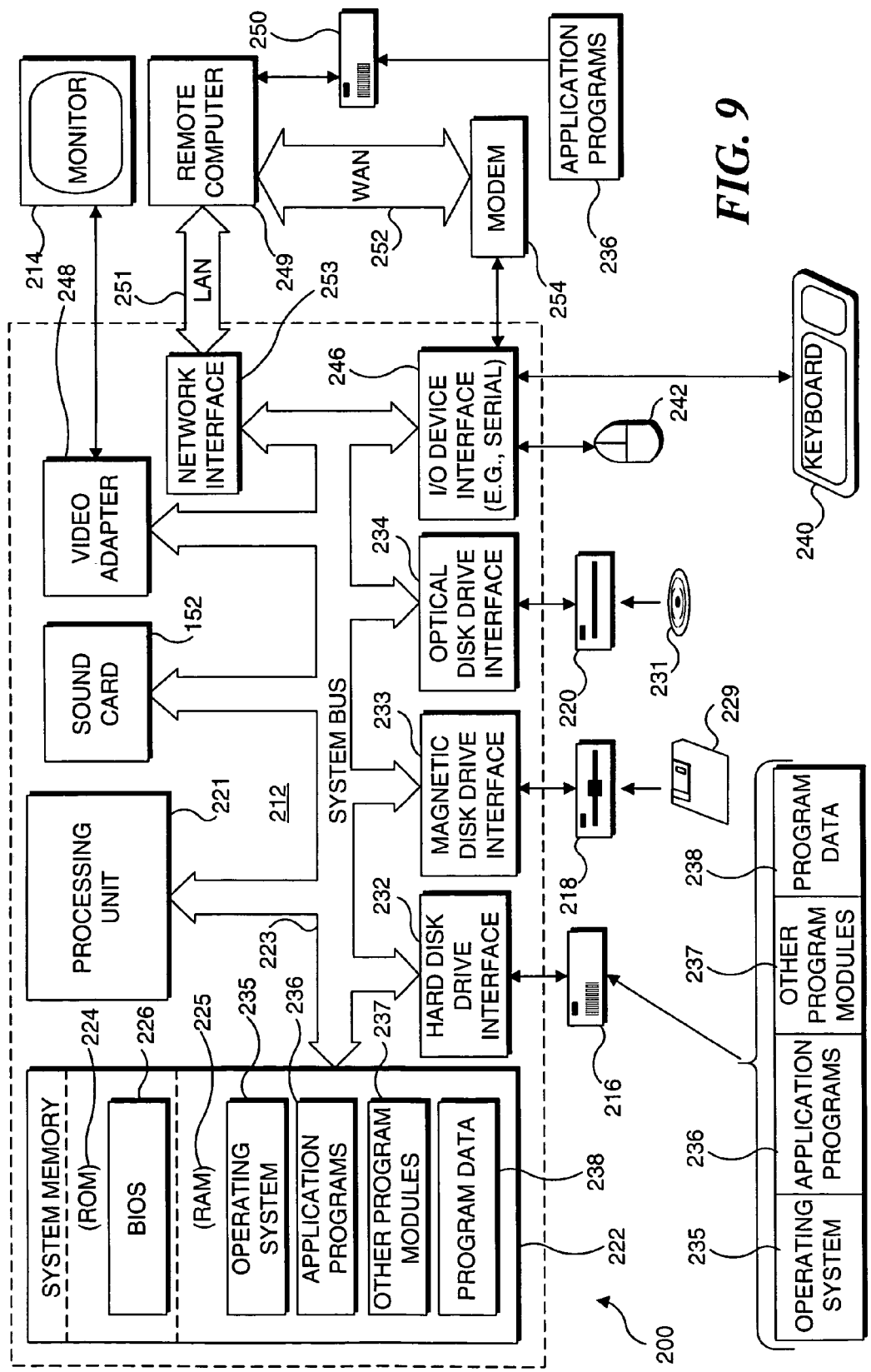

FIGS. 8A and 8B are flowcharts respectively showing the logical steps implemented when style identifiers and attribute rankings are associated with a plurality of media clips, and the logical steps employed when a user searches based on a selected style and sorts the media clips based upon an absolute ranking of the media clips for a selected attribute, in accord with the present invention; and FIG. 9 is a schematic block diagram of a personal computer (PC) system that is suitable for implementing the present invention.

DESCRIPTION OF THE PREFERRED EMBODIMENT

Perhaps the most common type of media clips commonly in use are clip art files that are suitable for insertions within presentations, word processing documents, emails, and various other publications. Literally hundreds of thousands of clip art files are available to consumers over the Internet and through other sources. Currently, Microsoft Corporation includes clip art files with certain software application programs such as with those in its OFFICE 2000™ suite of programs, but makes many more clip art files and other types of media clips available for downloading without charge over the Internet. The media clips can be accessed using a conventional browser such as INTERNET EXPLORER™ to connect to Microsoft Corporation's web site CLIP GALLERY LIVE 2000™, which can be accessed by entering the uniform resource locator (URL) http://cgl.microsoft.com/clipgallerylive/ in the browser address window. Alternatively, it will often be more convenient for a user to access the downloadable media clips from within Microsoft Corporation's software programs such as PUBLISHER 2000™ or WORD 2000™ by selecting an appropriate menu option in the program. Selection of the menu option activates a user's browser and automatically accesses Microsoft Corporation's CLIP GALLERY LIVE 2000™ web site. For example, in various versions of Microsoft Corporation's WORD™ word processing program, the online media clips can be accessed by selecting the menu item "Insert," and from the drop-down list that then appears, selecting "Picture," which opens another drop-down list from which "Clip Art" can be selected. Once the Clip Art menu item is selected, a dialogue box opens that includes an option for connecting to Microsoft Corporation's web site so that the user can search or browse the media clips available there and download any media clip(s) suitable for the user's needs. In some cases, the user may already have one or more appropriate media clips stored on a local hard drive or stored in a database in a hard drive on a server that is accessible over a local area network (LAN). Such media clips are typically stored within a folder that is shared by the various Microsoft Corporation software applications that employ media clips. When media clips are downloaded from Microsoft Corporation's media clip web site, they are automatically downloaded into a shared common folder for such applications, which makes them readily accessible by each of these applications if the user wants to select a clip art for a particular need from the collection in the folder.

Figure 1:
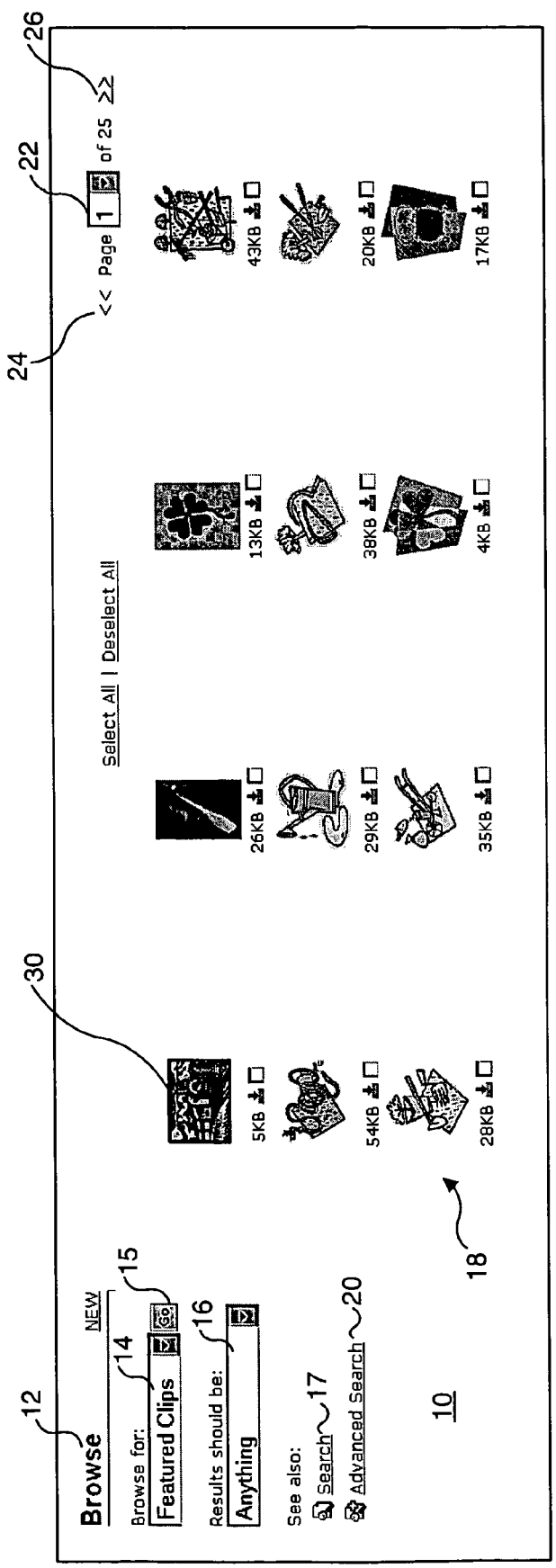

FIG. 1 illustrates a portion of a web page that is displayed in a browser when a user connects to the CLIP GALLERY LIVE 2000™ web site and decides to browse for a particular media clip. In the example illustrated in FIG. 1, a partial web page 10 includes a label 12 that indicates that the user is reviewing media clips in a Browse mode. In this example, the user has selected a category "Featured Clips" in a drop-down list box 14, which is used for enabling the user to select one or more predefined categories for media clips. Each media clip included in the database of media clips for the site has been associated with at least one such category. A drop-down list box 16 enables the user to select one or more different types of media clips to browse within the category selected in drop-down list box 14. Currently, the different types of media clips available on the web site and in drop-down list box 16 include: "Anything" (i.e., all of the different types), "Clip Art," "Photos," "Sounds," and "Motion." Once the two selections from drop-down list boxes 14 and 16 are made, the user can activate a "Go" control 15, which causes the selected category and type of media clip to be used for limiting the browsing of the many media clips that are available in the database accessible through this web site. A control 17 can be selected by the user to change to a search mode, discussed below, and additional advanced options are accessible for searching by selecting a control 20.

In the example shown, the user has selected "Featured Clips" as the category to be browsed and requested that only media clips be identified (i.e., be displayed as thumbnail icons) that fit within this selected predefined category. In response, 25 web pages of various thumbnail icons corresponding to the selected category of Featured Clips have been identified, and from these 25 pages, results 18 are on the first of these web pages. A thumbnail icon 30 is typical of the other thumbnail icons included on page 1 and is a reduced resolution, relatively smaller reproduction of the image in a clip art file represented by the thumbnail icon. Among the options that can be set regarding the display of web page 10 at the web site are the number of media clips that will be identified as meeting the selected criteria when browsing or searching the database and also, the maximum number of rows and columns of thumbnail icons that will be included on each web page displayed. These options are set by making choices on a web page that is not shown, but which is accessed by selecting an appropriate tab displayed on the CLIP GALLERY LIVE 2000™ homepage. To select other of the pages of thumbnail icons that are returned when browsing or searching the database, the user may activate a drop-down list box 22, which lists the pages currently available for selection. Alternatively, a "previous page" control 24 (displayed as "<<") and a "next page" control 26 (displayed as ">>") are provided to enable the user to selected either the previous or next page among those returned by browsing or searching the database, respectively. In the example shown in FIG. 1, since page 1 has been displayed, control 24 is "grayed out," since page 1 is the first in the series of the pages of media clip thumbnail icons returned by browsing the database in accord with the selections made by the user.

Figure 2:
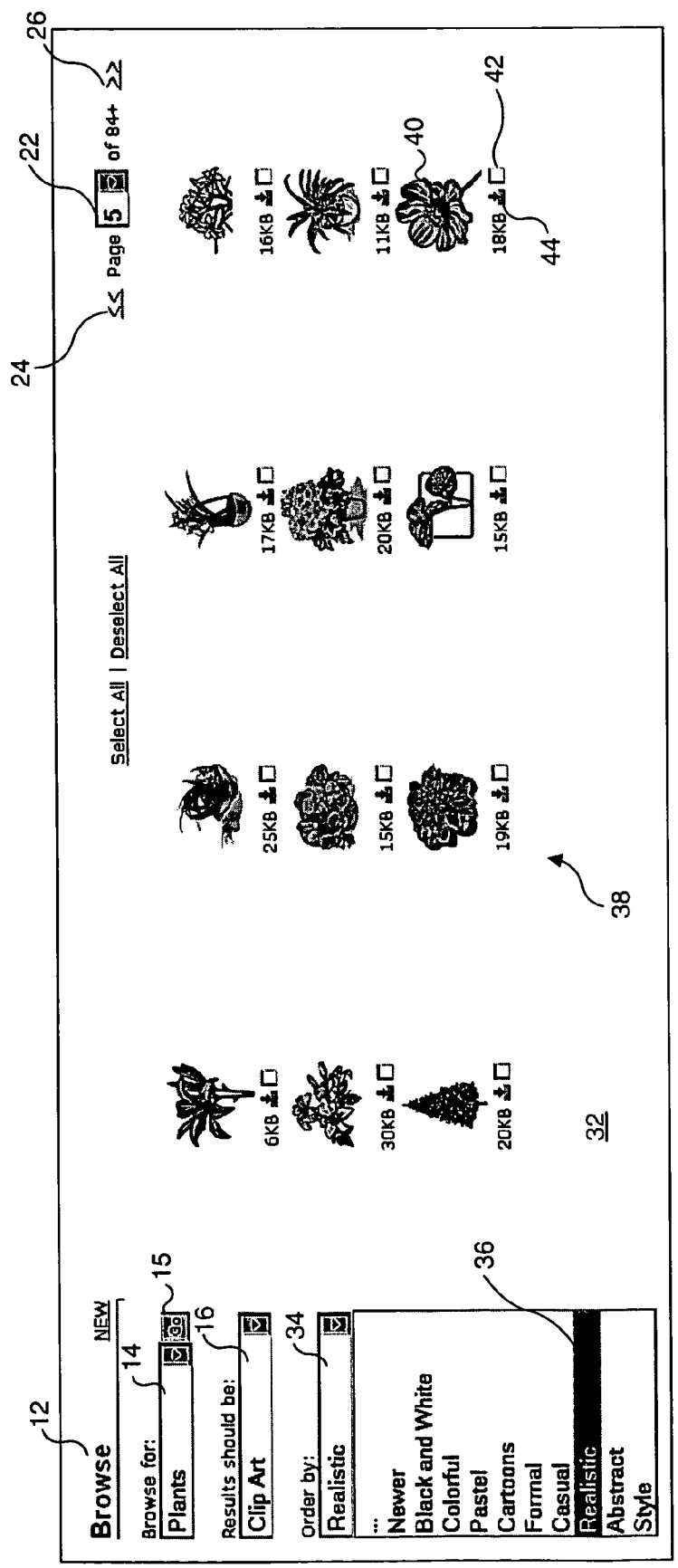
FIG. 2 is a color reproduction of a portion of a web page produced by browsing a selected category of media clips that have been sorted based upon an absolute ranking of the media clips for a selected attribute.

FIG. 2 illustrates a second example and includes a portion of a web page 32 in which thumbnail icons 38 are returned based upon selections made by a user of options in drop-down list boxes 14 and 16. The results are sorted based upon ranking values assigned in connection with an attribute selected by the user in a drop-down list box 34. In this example, the user has selected a category entitled "Plants" in drop-down list box 14, and has specified that all results should be Clip Art (for the type of media clip) in drop-down list box 16. Also, drop-down list box 34 includes the various attributes from which a user can optionally select when sorting the results returned from browsing or searching the database of media clips based on the entries in drop-down list boxes 14 and 16. In this example, the user has selected "Realistic" for the attribute, as indicated by a selection bar 36.

Each of the attributes included in the drop-down list box of FIG. 2 is generally applicable to clip art, while other predefined attributes may be assigned to other types of media clips. For the present embodiment, an absolute ranking for each of the appropriate attributes is associated with each clip art file in the database. The association of a ranking value for each attribute with a clip art file is done by an expert in a subjective determination. In this embodiment, the absolute ranking values range from a 1, for clip art images having the highest degree of that attribute, to a relatively greater ranking value for those media clips having proportionately less of the attribute. Table 1 lists the predefined attributes associated with clip art media clips and the various ranking values that can be associated with the clip art files for each such attribute.

TABLE 1

| Attribute | Rank Value | Description |
|---|---|---|
| Abstract | 1 | Most Abstract |
| | 2 | 2nd Most Abstract |
| | 3 | Icons |
| | 4 | Abstract Stylized |
| | 5 | Abstract Whimsical |
| | 6 | Cartoon |
| | 7 | Realistic Cartoon |
| | 8 | Realistic Whimsical |
| | 9 | Alphabets, Maps, Flags and Signs |
| | 10 | Stylized Realistic |
| | 11 | Semi-realistic |
| | 12 | Almost Realistic |
| | 13 | Realistic |
| BlackWhite | 1 | Black & White |
| | 2 | Black and a Neutral Color |
| | 3 | Black and 1 Color |
| | 4 | Black with Limited Palette |
| | 5 | Distinctive Black |
| | 6 | Full-colored Images with Black |
| | 7 | Images without Black |
| Cartoon | 1 | The Most Cartoon |
| | 2 | 2nd Most Cartoon |
| | 3 | Realistic Cartoons |
| | 4 | Unconventional Cartoon |
| | 5 | Whimsical |
| | 6 | Graphic |
| | 7 | Symbols, Alphabets, Icons, Flags and Maps |
| | 8 | Semi-Realistic |
| | 9 | Realistic |
| Casual | 1 | Very Casual |
| | 2 | Casual |
| | 3 | Casual Pre-cartoon |
| | 4 | Cartoon |
| | 5 | Formal Cartoon |
| | 6 | Semi-Graphic |
| | 7 | Graphic |
| | 8 | Symbols, Icons, Maps, Flags and Alphabets |
| | 9 | Graphic Realistic |
| | 10 | Semi-Realistic |
| | 11 | Realistic/Formal |

TABLE 1-continued

| Attribute | Rank Value | Description |
|---|---|---|
| Colorful | 1 | The Most Colorful |
| | 2 | 2nd Most Colorful |
| | 3 | 3rd Most Colorful |
| | 4 | Mid-Range Colorful |
| | 5 | Almost Pastel |
| | 6 | Pastel |
| | 7 | Significant Dark Colors |
| | 8 | Black and Pale Color |
| | 9 | Black and White |
| Formal | 1 | Most Formal |
| | 2 | 2nd Most Formal |
| | 3 | Symbols, Icons, Maps, Alphabets and Flags |
| | 4 | Formal Conceptual |
| | 5 | Casual Conceptual |
| | 6 | Business Cartoon |
| | 7 | Formal "Home" |
| | 8 | Casual |
| | 9 | Casual - Whimsical |
| | 10 | Sophisticated "Home" Cartoon |
| | 11 | Cartoon |
| Pastel | 1 | Pastel |
| | 2 | 2nd Most Pastel |
| | 3 | 3rd Most Pastel |
| | 4 | Mid Range Color |
| | 5 | Colorful |
| | 6 | More Colorful |
| | 7 | The Most Colorful |
| | 8 | Black, Gray and Neutral |
| | 9 | Black and White |
| Realistic | 1 | Most Realistic |
| | 2 | 2nd Most Realistic |
| | 3 | 3rd Most Realistic |
| | 4 | Semi-realistic |
| | 5 | Graphic Realistic |
| | 6 | Expressive Realistic |
| | 7 | Sophisticated Cartoons |
| | 8 | Cartoons |
| | 9 | Whimsical Realistic |
| | 10 | Stylized Realistic |
| | 11 | Icons |
| | 12 | Symbols, Alphabets, Signs, Flags, and Maps |
| | 13 | The Most Abstract |

As will be evident from Table 1, for the attribute labeled "Abstract," a media clip that is the most abstract in nature of all those available, will be associated with a ranking value of 1 for this attribute, while media clips that are the least abstract and therefore tend to be the most realistic will be associated with a ranking value of 13. Various degrees of the Abstract attribute quality are associated with the intermediate ranking values between these two extremes, as shown in Table 1. Other attributes have a range of ranking values only from 1 to 9 or from 1 to 10. Table 1 does not show one of the predefined attributes, which is "Photographic." This attribute is associated with a simply binary ranking value (0 or 1), indicating that the media clip is either a photograph or not.

FIG. 2 is also different than FIG. 1 in regard to the page that is displayed, since as indicated in drop-down list box 22, thumbnail icons 38 on page 5 are displayed, from over 84 pages that were identified, based upon the selections entered by the user in drop-down list boxes 14 and 16. Since these media clips on page 5 have been sorted based upon their absolute ranking value for the Realistic attribute, the thumbnail icons shown on page 5 are probably less realistic than those found on page 1 (not shown).

Figure 3:
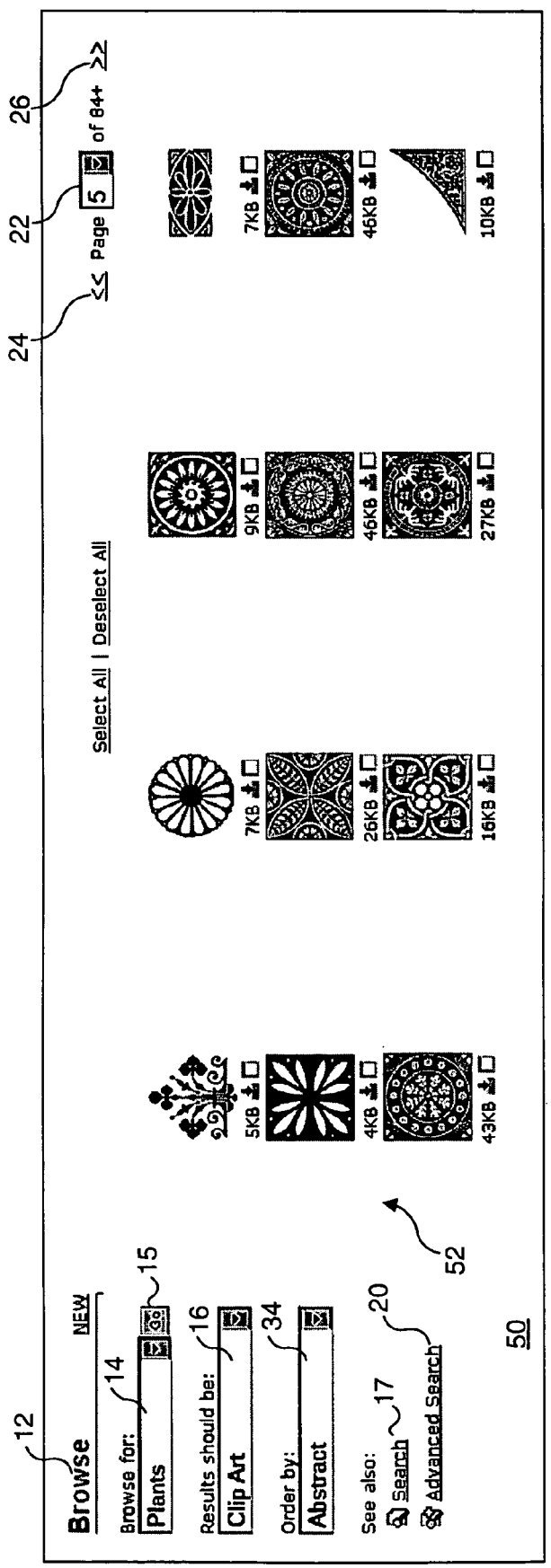
FIG. 3 is a color reproduction of a portion of a web page showing the results of sorting the media clips returned from browsing the category that was selected in the example of FIG. 2, based upon the ranking of the media clips for a different attribute.

FIG. 3 illustrates a portion of a web page 50 produced in response to the user selectively browsing for "Plants" as the selected category in drop-down list box 14, "Clip Art" type media clips, as indicated in drop-down list box 16, and selectively ordering the media clips that are identified based upon their absolute ranking under the attribute "Abstract," as shown in drop-down list box 34. Again, drop-down list box 22 indicates that the user is currently viewing page 5 on which thumbnail icons 52 identified in accord with the selections made by the user are displayed. It will be very apparent that the choice by the user to order the media clips identified based upon their rank for the attribute "Abstract" has returned a substantially different set of thumbnail icons on page 5 in FIG. 3 than the ordering by the absolute ranking values associated with the same media clips for the attribute "Realistic" in FIG. 2. The much greater abstract nature of the thumbnail icons shown in FIG. 3 compared to those shown in FIG. 2 clearly indicates the affect of ordering by two opposite attributes, i.e., "Realistic" and "Abstract".

Assuming that a user has browsed through pages 1 to 5 for the media clips identified based upon the selections made as shown in FIG. 2, viewing each of the thumbnail icons 30 and finally identifying a thumbnail icon 40 as being suitable for an intended purpose by the user, the user then has the option of immediately downloading the media clip to the predefined storage location for media clips on the user's hard drive or in a server storage. Alternatively, the user can select a check box 42, indicating that the thumbnail icon 40 has been selected for subsequent download by the user.

Figure 4:
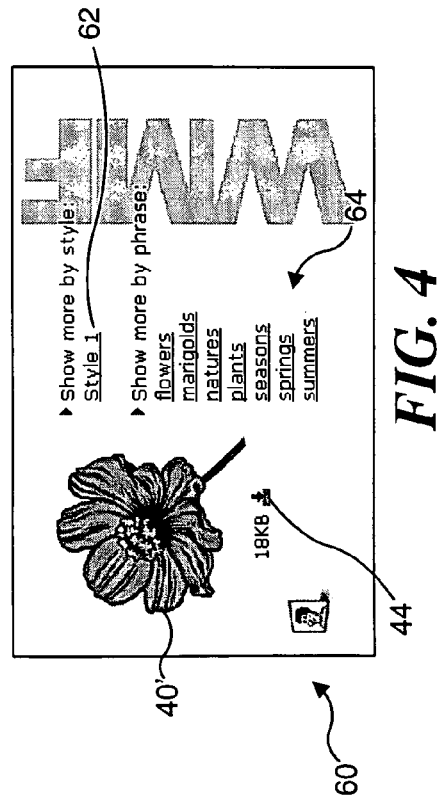
FIG. 4 is a color reproduction illustrating the content of a window that was displayed as a result of a user selecting one of the thumbnails in FIG. 2.

To immediately download thumbnail icon 40, the user can click a control 44. However, if a user clicks on thumbnail icon 40, a larger image 40' is displayed in a window 60 as shown in FIG. 4. Window 60 also includes further information of potential interest to the user including a plurality of keywords 64 that have previously been assigned to the clip art file represented by thumbnail icon 40. A style identifier 62 associated with this media clip is also shown in window 60, giving the user the option of searching and identifying other media clips that have been associated with the same style identifier. The association of a style identifier with a clip art file is done by an expert in a subjective determination. To select either other media clips associated with the same style identifier, or to select other media clips having any of the listed keywords associated with them, the user simply clicks on the style identifier or selected keyword with a mouse or other pointing device. The style identifier value displayed in window 60 serves as a control that will implement the indicated action, i.e., showing other media clips associated with the same style identifier, and the listed keywords each serve as a control that will search for and identify other media clips associated with the selected key word. Also, the user has the option of immediately downloading the media clip referenced by thumbnail icon 40 by activating control 44. The relative size of the media clip file is listed in window 60 and the sizes of the other media clip files are next to the other thumbnail icons displayed on partial web page 32 in FIG. 2. Accordingly, the user will have some idea of the required time to download each media clip, based upon the size of its file.

Figures 5, 6:
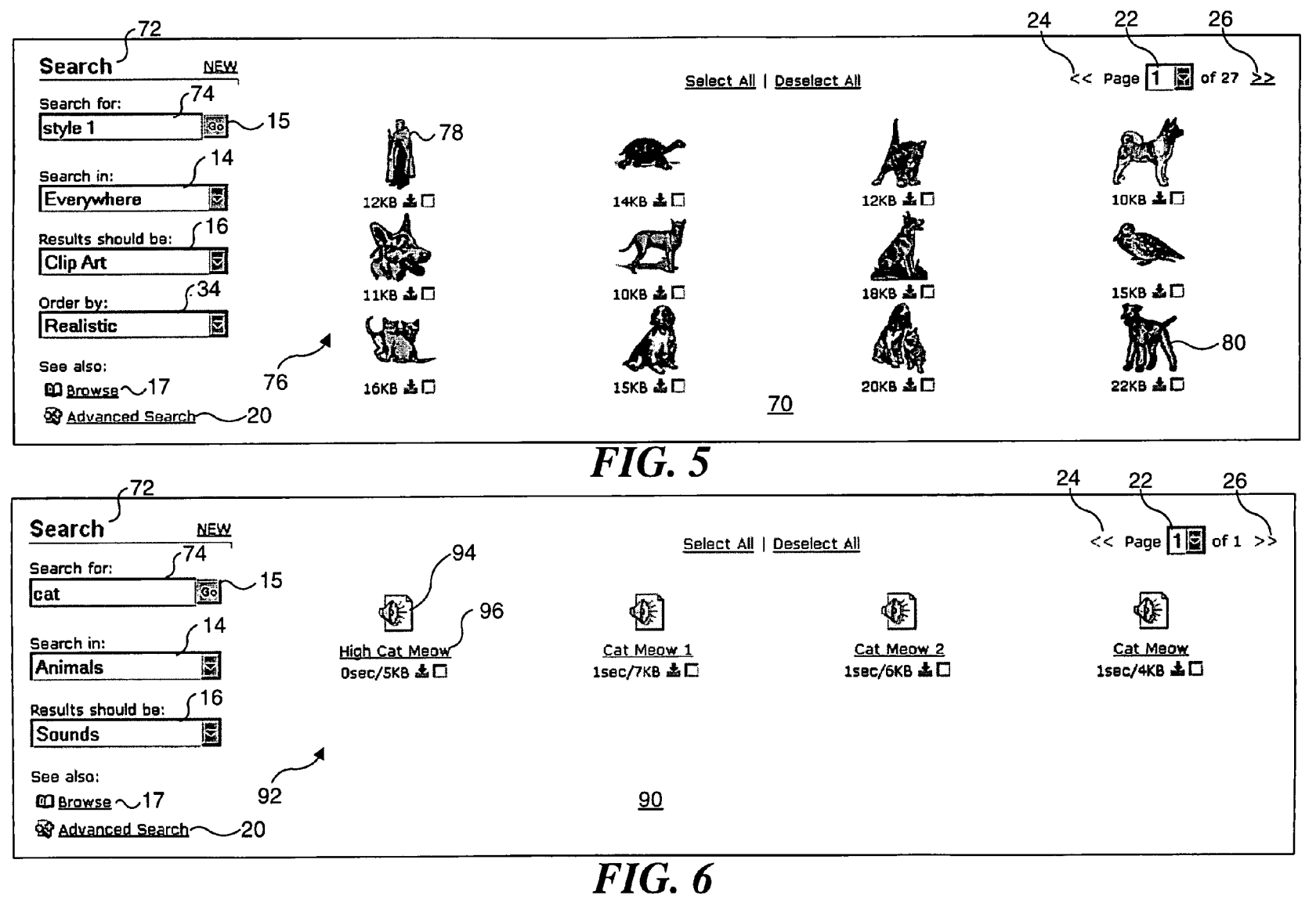

If, in FIG. 4, the user selects the option to search for more media clips that have been associated with "Style (identifier) 1," a plurality of additional media clips will be identified that meet this requirement, as shown in a partial web page 70, in FIG. 5. In FIG. 5, only a first of 27 such web pages of thumbnail icons 76 representing media clips associated with the selected style identifier is illustrated. It should also be noted that by selecting search control 17 in FIG. 2 or 3, and entering a desired style identifier in a text box 74, i.e., "Style 1," the user can also search for media clips that have been associated with the style identifier.

In FIG. 5, the results shown have been identified by carrying out a search in the search mode as indicated by a mode label 72. The user has the option of returning to the browse mode by selecting mode control 17, which now displays the label "Browse." The default in this embodiment is to search for a selected style in a category "Everywhere" (listed in drop-down list box 14), but alternatively, a user can specify a specific selected category for the search. In addition, the user has the option of identifying the type of media clip in drop-down list box 16 for which the search should be made. Since the results have been sorted by the absolute ranking value associated with the selected attribute "Realistic," a thumbnail icon 78, which is disposed in the upper left hand corner of page 1 will have a ranking value for the attribute "Realistic," which is greater than or equal to that of a thumbnail icon 80, disposed in the lower right hand corner of the web page. Similarly, if the user displays successive pages returned by the search for media clips having the selected style identifier, each successive page will display thumbnail icons that will typically have relatively lower ranking values for the selected attribute.

FIG. 6 illustrates a portion of a web page 90 that is returned to display a plurality of thumbnail icons 92 representing media clips for which the user has searched based upon parameters entered in text box 74 and drop-down list boxes 14 and 16. In this case, the user has entered a keyword "Cat" in text box 74, and has elected to search within the category "animals" selected from drop-down list box 14.

More importantly, the user has chosen to search only for media clips representing sounds (e.g., *.wav files). Because of these limiting criteria, only a single page has been returned by the search, showing thumbnail icons 92. A representative icon 94 is shaped like a speaker to indicate that the media clip is a sound, and a descriptive phrase 96 is included to describe the sound provided by the media clip. Again, the user has the option of selectively downloading the media clip, marking it for later download, or previewing the media clip by clicking on icon 94, which will open a window enabling the user to hear the sound by playing it through a sound system on the user's PC. Thus, it should be apparent that the user has the option to search for different types of media clips based upon the selection made in drop-down list box 16 and that the present invention is extensible to different types of media clips. In this preferred embodiment, a style identifier has not been associated with sound media clips. However, one can readily appreciate that style identifiers could be associated with any type of media clip.

It is important to understand that the style identifier associated with each of the media clips in accord with the present invention is not in any way equivalent to the one or more keywords that are also associated with the media clips. While several keywords can be associated with each media clip, only a single style identifier is. Furthermore, a keyword is usually selected that relates to the subject matter of the media clip rather than to the kind of qualities of the media clip indicated by the style associated it. For example, in regard to clip art files, the style identifiers used with the collection of clip art files available at Microsoft's CLIP GALLERY LIVE 2000™ web site refer to over 1,100 different styles. However, it is not intended that this number of different styles be in any way limiting. For different types of media clips, substantially fewer or substantially greater numbers of different styles and related style identifiers may be appropriately used to provide the best indication of the characteristics of the media clips. In the present exemplary embodiment, the style identifiers are simply numeric values; however, it is contemplated that the style identifier might be any alphanumeric characters.

Art experts have determined the appropriate style associated with media clips in the database available at the Microsoft Corporation web site. These art experts have reviewed each media clip and subjectively determined the appropriate style and thus the style identifier that should be associated with the media clip based upon the artistic impression and other subjective characteristics of each media clip. Although media clips that have common keywords may in some cases be associated with media clips associated with the same style identifier, the keyword is definitely not the criteria used to determine the appropriate style identifier. In many cases, it will be difficult to express in a few simple words the qualities of a media clip that led the art expert to perceive that a specific style was appropriate for association with the media clip.

FIG. 7 clearly illustrates that a concept (keyword) associated with each of a plurality of different media clips does not correspond to the style identifier that has been associated with the media clips. In this Figure, the concept or keywords are listed along the left column, while the style identifiers for each of the media clips illustrated are identified in the top row. Based upon a review of this Figure, it should be clear that media clips associated with the keyword "dog" can be represented by very different styles. Similarly, media clips that create a similar artistic impression have the same style identifier associated with them, but do not relate to the same concept or keyword. For example, style identifier 149 is used in connection with a particular impressionistic quality that is common to each of the media clips with which that style identifier is associated. For each of the other columns that include media clips associated with a common style, the similarities in the qualities of those media clips that cause an expert to associate them with the same style identifier should be evident.

Turning now to FIG. 8A, the logical steps carried out in associating keywords, categories, style identifiers, and for each attribute, a ranking value with each of the media clips in a database in accord with the present invention are shown. A block 100 provides that an expert begins an evaluation of each media clip included within a database. As indicated in a block 102, for each media clip being reviewed, the expert carries out the following actions. First, as provided by a block 104, the expert specifies keywords and categories that will be associated with each media clip being reviewed. As noted above, one or more keywords and one or more categories can be associated with a clip art file and with other types of media clips. Next, in a block 106, the expert selects a style identifier for the current media clip being reviewed from a style list. Currently, more than 1,100 styles have been defined from which the expert can select the most appropriate style, based upon a subjective evaluation of the various characteristics and qualities of the media clip being evaluated. For each of these styles, a corresponding style identifier is provided. The expert chooses the style, which thus determines the style identifier that will be associated with the media clip being reviewed. In a block 108, an attribute ranking value is associated with the media clip being reviewed, for each pertinent attribute, again based upon a subjective determination by the expert evaluating the media clip. As previously noted, Table 1 lists the different kinds of attributes that have been predefined and which may or may not be relevant depending upon the type of media clip being reviewed. For each relevant attribute, the subjective evaluation by the expert determines the absolute ranking for the media clip, for example, on a scale of 1 to 9, 1 to 10, or 1 to 13, as indicated in Table 1, which applies to clip art in this preferred embodiment. Finally, in a block 110, the keywords, categories, style identifier, and attribute ranking values for the media clips are stored in a database in association with each of the media clips that were reviewed by the expert.

FIG. 8B indicates the logical steps carried out when a user accesses a database, as indicated in a block 112. A block 114 indicates that the user may implement a search of the media clips in the database as a function of a keyword entered by the user or may browse a category to identify a media clip that best suits the needs of the user. In some cases, the user may already know of a particular style that is desired for the media clip. As indicated in a decision block 116, if the user wants to search the database, a block 118 provides for enabling the user to select the style and to initiate the search based on that style.

The user has the option of sorting the media clips identified by the search, based on either the attribute or the style associated with the media clips, as indicated in a block 120. Block 120 is also reached if the user does not want to initially search based upon style, but instead simply wants to sort the media clips that are being browsed in a particular category, or to sort the media clips that were returned based upon a search conducted in response to a keyword entered by the user. In some cases, the resulting media clips returned from a search may be ranked in accord with a default attribute such as "Newer." However, the user can enter a different attribute as a basis for sorting the media clips that have been returned based upon the search in block 114 or the search in block 118. In a block 122, the system carries out a database query sort based upon the attribute or style entered by the user in block 120. The resulting sorted media clips are then indicated to the user and in one or more displayed pages. A decision block 124 gives the user the alternative option of sorting by a different attribute. If the user wants to sort by a different attribute, the logic returns to block 120. Otherwise, the logic proceeds to decision block 126, which determines if the user wants to do another search. If so, the logic returns to block 114, enabling the search to be conducted based on a different keyword or category selected by the user. If the user does not choose to do another search, the logic terminates, enabling the user to select from any of those media clips that have been identified as meeting the criteria entered by the user.

It should be noted that the task of associating keywords, categories, style identifiers, and attribute ranking values for each of the attributes pertinent to media clips can be carried out using a PC, for example, by completing a series of dialogue boxes for each media clip being reviewed by an expert. A software program provided to associate the selected keywords, categories, style identifier, and attribute ranking values with each media clip is relatively straightforward and simply carries out the logical steps indicated in FIG. 8A. Similarly, the database that includes the media clips can be searched by a user by employing the logic indicated in FIG. 8B. Microsoft Corporation's CLIP GALLERY LIVE 2000™ web site enables a user to access the media clips stored in its database that have been processed in accord with the logic in FIG. 8A and to carry out each of the logical steps indicated in FIG. 8B after a connection is made with this web site through the Internet with the user's browser. Alternatively, the same logic can be implemented for accessing clip art and other types of media clips stored on the user's hard drive or in a different database accessible over a LAN to which the user is connected, by providing appropriate HTML pages for accessing the database that include HTML code or by using an alternative application program that implements the steps shown in FIG. 8B. The media clips can also be accessed using a different type of interface than a browser. By providing the ability to search and sort by a particular style, the present invention greatly expands upon the ability of a user to identify an appropriate media clip for an intended use.

FIG. 9 and the following discussion are intended to provide a brief, general description of a suitable computing environment for implementing the present invention. Although not required, certain aspects of the present invention are described in the general context of computer executable instructions, such as program modules, that are executed by a PC 200. Generally, program modules include routines, programs, objects, components, data structures, etc. that perform particular tasks. Moreover, those skilled in the art will appreciate that this invention may well be practiced with other processor configurations and on a variety of very different types of electronic devices, including hand-held devices such as personal data assistants (Pads), pocket PCs, and cell phones, multiprocessor systems, microprocessor based or programmable consumer electronic devices, network personal computers, minicomputers, mainframe computers, home servers, small business server appliances, focused enterprise devices, game consoles, Internet appliances, and TV attached products (such as set top boxes, gaming devices, video management devices, and WebTV™).

With reference to FIG. 9, an exemplary system for implementing the present invention includes a general purpose computing device in the form of conventional PC system 200, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help to transfer information between elements within PC system 200, such as during start-up, is stored in ROM 224. PC system 200 further may include hard disk drive 216 for reading from and writing to a hard disk, not shown, and may include magnetic disk drive 218 for reading from or writing to a removable magnetic disk 229, and optical disk drive 220 for reading from or writing to a removable optical disk 231, such as a compact disk-ROM (CD-ROM), DVD, or other optical media. Hard disk drive 216, magnetic disk drive 218, and optical disk drive 220 are connected to system bus 223 by a hard disk drive interface 232, a magnetic disk drive interface 233, and an optical drive interface 234, respectively. The drives and their associated computer readable media provide nonvolatile storage of computer readable machine instructions, data structures, program modules and other data for PC system 200, including media clips. Although the exemplary environment described herein employs a hard disk, removable magnetic disk 229, and removable optical disk 231, it will be appreciated by those skilled in the art that other types of computer readable media, which can store data that are accessible by a computer, such as magnetic cassettes, flash memory cards, digital video disks, Bernoulli cartridges, RAM cards, ROM, and the like, may also be used in the exemplary operating environment.

A number of program modules may be stored on the hard disk, magnetic disk 229, optical disk 231, ROM 224 or RAM 225, including an operating system 235, one or more application programs 236, other program modules 237, and program data 238. A user may enter commands and information into PC system 200 through input devices such as a keyboard 240, a microphone (not shown), and a pointing device 242. Other input devices (not shown) include a joystick, a game pad, a satellite dish, a scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or (USB) port, as appropriate for the external devices that are thus coupled to the PC system. A monitor 214 or other type of display device is also connected to system bus 223 via an appropriate interface, such as a video adapter 248. In addition to the monitor, PCs are often coupled to other peripheral output devices (not shown), such as printers. The speakers connected to sound card 152 are not shown in this Figure.

PC system 200 may operate in a networked environment using logical connections to one or more remote computers, such as a remote computer 249. Remote computer 249 may be another PC, a server, a router, a network PC, a peer device, or other common network node, and typically includes many or all of the elements described above in connection with PC system 200, although only an external memory storage device 250 has been illustrated in FIG. 9. The logical connections depicted in FIG. 9 include a LAN 251 and a wide area network (WAN) 252. Such networking environments are common in offices, enterprise-wide computer networks, intranets and the Internet.

When used in a LAN networking environment, PC system 200 is connected to LAN 251 through a network interface or adapter 253. If used in a WAN networking environment, PC system 200 typically includes a modem 254, or other means for establishing communications over WAN 252, and over the Internet. Modem 254, which may be internal or external, is connected to the system bus 223, or coupled to the bus via I/O device interface 246, i.e., through a serial port. In a networked environment, program modules depicted relative to PC system 200, or portions thereof, may be stored in the remote memory storage device. It will be appreciated that the network connections shown are exemplary and other means for establishing a communications link between computing devices may alternatively be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for enabling media clips having a common desired characteristic quality to be identified from among a plurality of different media clips, each of the plurality of different media clips having been previously associated with a style identifier that is indicative of and corresponds to a characteristic quality of the media clip, said method comprising the steps of:

(a) enabling a desired style identifier to be provided as a search criterion, association of the style identifier with each media clip being based upon an evaluation of a characteristic quality of the media clip, an identical style identifier being associated with different media clips that have been determined to have a common characteristic quality, but which do not necessarily relate to a common subject or share a single quantifiable attribute;
   (b) initiating an automated search of the plurality of different media clips, based upon the search criterion; and
   (c) as a result of the automated search of the plurality of different media clips, identifying media clips that have been associated with the desired style identifier and thus have a common desired characteristic quality.

2. The method of claim 1, wherein each media clip in the plurality of different media clips has previously been associated with an absolute ranking value for each of a plurality of different attributes, further comprising the steps of:
   (a) enabling a desired attribute to be provided to sort the plurality of different media clips based upon the absolute ranking value of the desired attribute that was associated with each of the plurality of different media clips; and
   (b) automatically sorting the plurality of different media clips as a function of the absolute ranking value associated with each media clip for the desired attribute.

3. The method of claim 1, wherein each of the plurality of different media clips has previously been associated with an absolute ranking value for each of a plurality of different attributes, further comprising the steps of:
   (a) enabling a desired attribute to be provided to sort the media clips identified by the automated search; and
   (b) automatically sorting the media clips that were identified by the automated search, as a function of the absolute ranking value associated with each media clip for the desired attribute.

4. The method of claim 1, wherein the plurality of different media clips are stored in a database that is accessible over a network.

5. A method for enabling a user to carry out an automated search of a plurality of different media clips to identify any media clip included therein that has a characteristic quality desired by the user, comprising the steps of:
   (a) associating one of a plurality of different style identifiers with each of the plurality of different media clips, each different style identifier corresponding to a different characteristic quality, selection of a style identifier associated with each media clip being based upon a subjective evaluation of the characteristic quality of the media clip, an identical style identifier being associated with different media clips that subjectively have been determined to have the same characteristic quality, but which do not necessarily relate to a common subject;
   (b) enabling a user to indicate a specific style identifier upon which to search the plurality of different media clips; and
   (c) searching the plurality of different media clips in an automated manner, to identify media clips included therein that have been associated with the specific style identifier indicated by the user.

6. The method of claim 5, further comprising the step of associating absolute ranking values for each of a plurality of different attributes with each of the plurality of different media clips, a ranking value for each different attribute associated with each media clip being based upon a subjective evaluation of the media clip in regard to the attribute.

7. The method of claim 6, further comprising the steps of:
   (a) enabling a user to indicate a desired attribute upon which to sort media clips in an automated manner;
   (b) sorting the media clips in the automated manner based upon the absolute ranking value associated with each media clip for the desired attribute; and
   (c) enabling the user to access media clips, as thus sorted.

8. The method of claim 7, wherein the media clips that are sorted are the plurality of different media clips.

9. The method of claim 7, wherein the media clips that are sorted are the media clips identified by the automated search as being associated with the specific style identifier indicated by the user.

10. The method of claim 5, wherein the plurality of different media clips are stored as digital data in an electronically accessible memory.

11. The method of claim 5, wherein the plurality of different media clips are accessible by a user over a network.

12. The method of claim 5, further comprising the step of associating a keyword with each media clip included in the plurality of different media clips, for use in searching the media clips based upon a keyword.

13. The method of claim 12, further comprising the steps of:
   (a) enabling a user to indicate a desired keyword upon which to search the plurality of different media clips;
   (b) searching the plurality of different media clips as a function of the desired keyword, in an automated manner; and
   (c) identifying any media clip with which the desired keyword has been associated, as a result of searching in the automated manner.

14. The method of claim 12, wherein the step of enabling a user to indicate the desired style identifier comprises the steps of:
   (a) enabling the user to select a media clip from among any media clips that were identified as being associated with the desired keyword; and
   (b) employing the style identifier associated with the media clip selected by the user for use in searching the plurality of different media clips to identify other media clips associated with the style identifier that is identical to that of the media clip selected by the user.

15. The method of claim 14, further comprising the step of indicating any other media clips associated with the style identifier that is identical to that of the media clip selected by the user.

16. The method of claim 5, further comprising the step of associating a type identifier with each of the plurality of different media clips.

17. The method of claim 16, further comprising the steps of:
   (a) enabling a user to indicate a desired type identifier for use in searching the plurality of different media clips, in an automated manner; and
   (b) indicating any media clips found by searching that are associated with both the desired type identifier and with the desired style identifier, from among the plurality of different media clips.

18. The method of claim 5, further comprising the step of associating a category with each media clip included in the plurality of different media clips, for use in searching the media clips based upon a category.

19. The method of claim 18, further comprising the steps of:
   (a) enabling a user to indicate a desired category upon which to search the plurality of different media clips;

(b) searching the plurality of different media clips as a function of the desired category, in an automated manner; and (c) identifying any media clip with which the desired category has been associated, as a result of searching in the automated manner.

20. The method of claim 19, wherein the step of enabling a user to indicate the desired style identifier comprises the steps of:

(a) enabling the user to select a media clip from among any media clips that were identified as being associated with the desired category; and (b) employing the style identifier associated with the media clip selected by the user for use in searching the plurality of different media clips to identify other media clips associated with the style identifier that is identical to that of the media clip selected by the user.

21. The method of claim 20, further comprising the step of indicating any other media clips associated with the style identifier that is identical to that of the media clip selected by the user.

22. The method of claim 5, wherein the media clips identified by the search are each represented with an icon.

23. The method of claim 22, wherein the media clips comprise a graphic image, said icon comprising a thumbnail representation of the graphic image.

24. The method of claim 5, further comprising the step of enabling the user to select any of the media files identified by the search for transfer from a remote storage to a local storage, by activating a graphic control.

25. A memory medium having processor executable instructions for performing steps (b) and (c) of claim 5.

26. A memory medium having processor executable instructions for performing the steps of claim 7.

27. A method for sorting a plurality of different media clips, each of the plurality of different media clips having been previously associated with an absolute ranking value for each of a plurality of different attributes, the different attributes including at least one objective characteristic and a stylistic identifier representative of a subjective impression associated with a media clip, said method comprising the steps of:

(a) enabling a desired attribute to be input from a range of choices of the attributes including the objective characteristic and the stylistic identifier, to sort the plurality of different media clips based upon the absolute ranking value of the desired attribute that was associated with each of the plurality of different media clips; and (b) automatically sorting the plurality of different media clips as a function of the absolute ranking value associated with each media clip for the desired attribute.

28. A system that enables a user to carry out an automated search of a plurality of different media clips to identify any media clip included therein that has a characteristic quality desired by the user, each of the plurality of different media clips being associated with one of a plurality of different style identifiers, each different style identifier corresponding to a different characteristic quality, comprising:

(a) a processor;
(b) a display coupled in communication with the processor;
(c) a user input device that connected in communication with the processor and which enables a user to provide input data to the processor; and
(d) a memory coupled to the processor, said memory storing a plurality of machine instructions that are executed by the processor, causing the processor to carry out a plurality of functions, including:
  (i) enabling the user to employ the user input device to select a specific style identifier upon which to search the plurality of different media clips; and
  (ii) searching the plurality of different media clips, to identify media clips included therein that have been associated with the specific style identifier indicated by the user; wherein association of individual style identifiers with each media clip are based on an evaluation of a characteristic quality of the media clip, an identical style identifier being associated with different media clips that have been determined to have a common characteristic quality, but which do not necessarily relate to a common subject or share a single quantifiable attribute.

29. The system of claim 28, wherein the plurality of different media clips are stored in a non-volatile medium that is coupled in communication with the processor.

30. The system of claim 28, further comprising a local processor and a local memory in which machine instructions are stored that are executed by the local processor, said local processor being coupled to the display and the user input device, wherein the non-volatile medium and the processor are disposed at a location that is geographically remote from the user, the local processor, the local memory, the display, and the user input device, and wherein the processor is coupled in communication with the local processor over a data network.

31. The system of claim 30, wherein the machine instructions executed by the local processor cause the local processor to provide an identification on the display, of the media clips that have been associated with the specific style identifier indicated by the user.

32. The system of claim 28, wherein absolute ranking values for each of a plurality of different attributes are associated with each of the plurality of different media clips, a ranking value for each different attribute being associated with each media clip based upon a subjective evaluation of the media clip in regard to the attribute, and wherein the machine instructions further cause the processor to:

(a) enable the user to employ the user input device to indicate a desired attribute upon which to sort media clips; and
(b) sort the media clips based upon the absolute ranking value associated with each media clip for the desired attribute.

33. The system of claim 28, wherein a keyword is associated with each media clip included in the plurality of different media clips, and wherein the machine instructions executed by the processor further cause the processor to:

(a) enable the user to employ the user input device to indicate a desired keyword upon which to search the plurality of different media clips; and
(b) search the plurality of different media clips as a function of the desired keyword so as to identify any media clip with which the desired keyword has been associated.

34. The system of claim 28, wherein the machine instructions executed by the processor further cause the processor to:

(a) enable the user to employ the user input device to select a media clip from among any media clips that were identified as being associated with the desired keyword; and
(b) employ the style identifier associated with the media clip selected by the user for use in searching the plurality of different media clips to identify other media clips associated with the style identifier that is identical to that of the media clip selected by the user.

35. The system of claim 28, wherein a type identifier is associated with each of the plurality of different media clips, and wherein the machine instructions executed by the processor further cause the processor to:
  (a) enable a user to employ the user input device to indicate a desired type identifier for use in searching the plurality of different media clips; and
  (b) search the plurality of different media clips to identify any media clips that are associated with both the desired type identifier and with the desired style identifier.

36. A system that enables a user to carry out an automated sort of a plurality of different media clips, each of the plurality of different media clips being associated with an absolute ranking value for each of a plurality of different predefined attributes, the different attributes including at least one objective characteristic and a stylistic identifier representative of a subjective impression associated with the media clip, comprising:
  (a) a processor;
  (b) a display coupled in communication with the processor;
  (c) a user input device that connected in communication with the processor and which enables a user to provide input data to the processor; and
  (d) a memory coupled to the processor, said memory storing a plurality of machine instructions that are executed by the processor, causing the processor to carry out a plurality of functions, including:
    (i) enabling the user to employ the user input device to select a desired attribute from a range of choices including the objective characteristic and the stylistic identifier upon which to sort the plurality of different media clips, based upon the absolute ranking value that was associated with each of the different media clips; and
    (ii) sorting the plurality of different media clips, based upon the absolute ranking values of each of the plurality of different media clips for the desired attribute indicated by the user.

37. A method for enabling media clips having a common desired characteristic quality to be identified from among a plurality of different media clips, each of the plurality of different media clips having been previously associated with a style identifier that is indicative of and corresponds to a characteristic quality of the media clip, wherein each media clip in the plurality of different media clips has been previously associated with an absolute ranking value for each of a plurality of different attributes, said method comprising the steps of:
  (a) enabling a desired style identifier to be provided as a search criterion;
  (b) enabling a desired attribute to be provided to sort the plurality of different media clips based upon the absolute ranking value of the desired attribute that was associated with each of the plurality of different media clips;
  (c) initiating an automated search of the plurality of different media clips, based upon the search criterion;
  (d) as a result of the automated search of the plurality of different media clips, identifying media clips that have been associated with the desired style identifier and thus have a common desired characteristic quality; and
  (e) automatically sorting the plurality of different media clips as a function of the absolute ranking value associated with each media clip for the desired attribute.

38. A method for enabling media clips having a common desired characteristic quality to be identified from among a plurality of different media clips, each of the plurality of different media clips having been previously associated with a style identifier that is indicative of and corresponds to a characteristic quality of the media clip, and wherein each of the plurality of different media clips has previously been associated with an absolute ranking value for each of a plurality of different attributes, said method comprising the steps of:
  (a) enabling a desired style identifier to be provided as a search criterion;
  (b) enabling a desired attribute to be provided to sort the media clips identified by the automated search;
  (c) initiating an automated search of the plurality of different media clips, based upon the search criterion;
  (d) as a result of the automated search of the plurality of different media clips, identifying, media clips that have been associated with the desired style identifier and thus have a common desired characteristic quality; and
  (e) automatically sorting the media clips that were identified by the automated search, as: a function of the absolute ranking value associated with each media clip for the desired attribute.

* * * * *

UNITED STATES PATENT AND TRADEMARK OFFICE
CERTIFICATE OF CORRECTION

PATENT NO. : 6,970,859 B1  
APPLICATION NO. : 09/533504  
DATED : November 29, 2005  
INVENTOR(S) : Brechner et al.

Page 1 of 1

It is certified that error appears in the above-identified patent and that said Letters Patent is hereby corrected as shown below:

In column 18, line 40, in Claim 38, after "identifying" delete ",".

In column 18, line 44, in Claim 38, after "as" delete ":".

Signed and Sealed this

Twenty-fifth Day of August, 2009

David J. Kappos
*Director of the United States Patent and Trademark Office*